US006423431B1

(12) United States Patent
Wong et al.

(10) Patent No.: US 6,423,431 B1
(45) Date of Patent: Jul. 23, 2002

(54) MAGNETIC RECORDING MEDIA HAVING IMPROVED MAGNETIC AND PARAMETRIC PERFORMANCE WITH CHROMIUM ALLOY UNDERLAYER HAVING ADDED ALUMINUM

(75) Inventors: Bunsen Y. Wong, San Diego; Ji Feng Ying, San Jose, both of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/584,754

(22) Filed: May 30, 2000

(51) Int. Cl.$^7$ ............................... G11B 5/66; G11B 5/70
(52) U.S. Cl. ......................... 428/694 TS; 428/900; 428/65.6; 428/65.7
(58) Field of Search ...................... 428/65.6, 65.7, 428/694 TS, 900, 694 ST, 666, 667, 668

(56) References Cited

U.S. PATENT DOCUMENTS

| 4,652,499 A | 3/1987 | Howard ....................... 428/641 |
| 5,693,426 A | 12/1997 | Lee et al. .................... 428/611 |
| 6,174,598 B1 * | 1/2001 | Suzuki et al. ............... 428/332 |
| 6,248,416 B1 * | 6/2001 | Lambeth et al. ........... 428/65.3 |

FOREIGN PATENT DOCUMENTS

| JP | 03193851 A | * | 8/1991 |
| JP | 10041134 A | * | 2/1998 |

OTHER PUBLICATIONS

Lambeth, David N. et al., "Magnetic Media Performance: Control Methods for Crystalline Texture and Orientation", submitted for Publication in *MRS Proceedings* MRS Sym L: Paper #L8.1, Apr. 15, 1998 (Jun. 1, 1998), 12 pp.

* cited by examiner

*Primary Examiner*—Paul Thibodeau
*Assistant Examiner*—Holly Rickman
(74) *Attorney, Agent, or Firm*—David M. Sigmond

(57) ABSTRACT

In a magnetic recording medium such as a magnetic disk which has a multilayer structure including a supporting substrate, at least one underlayer supported by the substrate, and a magnetic layer overlying the underlayer, magnetic and parametric performance of the recording layer is enhanced by providing an underlayer comprising a chromium-aluminum ternary alloy (Cr—Al—X). The aluminum in the Cr—Al—X alloy is 0.5%–4.0% by atomic weight. A second underlayer of chromium or chrome alloy can be provided under the first underlayer in a multilayer structure.

32 Claims, 3 Drawing Sheets

MAGNETIC RECORDING MEDIA HAVING IMPROVED MAGNETIC AND PARAMETRIC PERFORMANCE WITH CHROMIUM ALLOY UNDERLAYER HAVING ADDED ALUMINUM

BACKGROUND OF THE INVENTION

This invention relates generally to magnetic recording media, such as magnetic thin film recording disks, and more particularly the invention relates to improving magnetic and parametric performance of such media by the addition of aluminum to a chromium alloy underlayer.

The magnetic disk drive as used for data storage in computer systems comprises one or more disks having thin film magnetic layers on opposing surfaces for the recording of magnetic data as bits along concentric tracks. Typically, as shown in FIGS. 1a, 1b, the disk comprises a substrate 4 of nickel phosphorous (NiP) or ceramic glass on which a plurality of layers are formed by sputtering in a low pressure inert gas atmosphere. The layers include an optional magnetic seed layer 6, a single non-magnetic underlayer 8 (FIG. 1a), or two non-magnetic layers 8, 9 (FIG. 1b), made of either pure chromium (Cr) or a chrome alloy (CrX, CrXY), covered by magnetic layer 10 of a cobalt (Co)-based alloy. A protective layer 12 of sputtered carbon is typically used on top of the magnetic layer and an organic lubricant 14 may be used on top of protective layer.

The chromium underlayer can be a single layer or a multilayer for increased performance. The chromium or chrome alloy has a body centered cubic (bcc, A2) lattice structure which has strong influences on the magnetic properties and the recording performance of the cobalt film. The chrome alloy expands the unit cell so as to improve lattice matching between the underlayer and the cobalt magnetic film. The addition of alloying elements also controls physical properties such as grain size and crystallographic texture, which can play an important role in the performance of the media.

SUMMARY OF THE INVENTION

The present invention improves magnetic and parametric performance of a magnetic recording media by adding a small amount (0.5% to 4.0% by atomic weight) of aluminum to a chromium alloy in a single underlayer or multiple underlayer structure.

The added aluminum as a third element in a CrMo alloy underlayer improves recording performance, and when used in a multilayer construction with chromium, the CrMoAl layer increases signal to noise ratio (SMNR). Similarly, the addition of aluminum in CrV alloy enhances signal to noise ratio and reduces intrinsic noise.

The invention and objects and features thereof will be more readily apparent from the following detailed description and dependent claims when taken with the drawing.

DETAILED DESCRIPTION OF ILLUSTRATED EMBODIMENTS

Figure 1A:
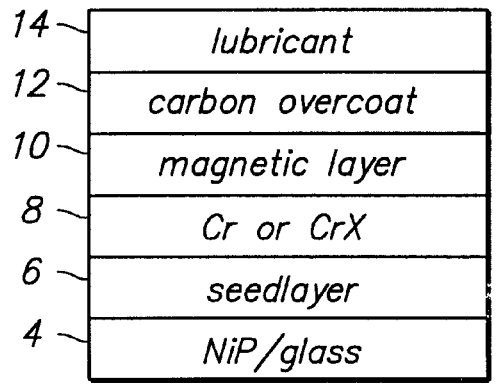
FIGS. 1a, 1b are schematics illustrating the construction of a thin film disk having a single underlayer and a dual underlayer construction, respectively.
Figure 1B:
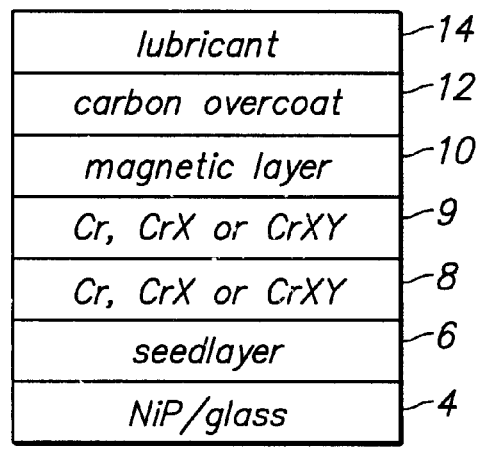

In accordance with the invention the structure for a magnetic recording medium such as a thin film disk as illustrated in FIGS. 1a, 1b is enhanced by the addition of aluminum (0.5% to 4.0% atomic weight) in the underlayers 8, 9 of the structure. The resulting underlayer is a ternary alloy of chromium, aluminum, and a third element which can be selected from C, Mg, Si, Ti, V, Co, Ni, Cu, Zr, Mo, Nb, La, Ce, Nd, Gd, Tb, Dy, Er, Ta, W and Mn, for example. The underlayer can be a single chromium alloy or a multiple layer which consists of chromium or chromium alloy under the chromium aluminum ternary alloy.

Figure 2:
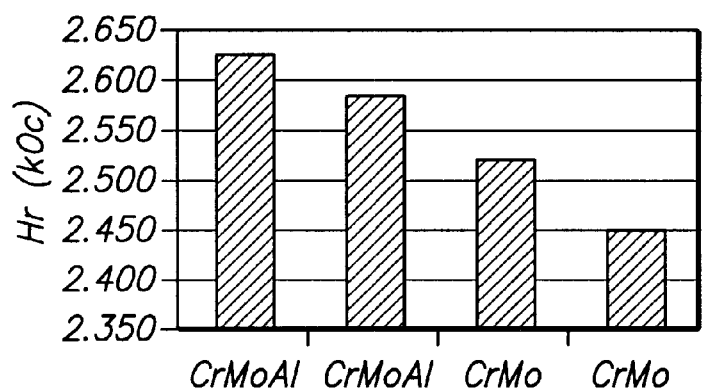
FIG. 2 is a graph illustrating the effect on coercivity (Hr) with the addition of aluminum in a CrMo underlayer in accordance with one embodiment of the invention.

FIG. 2 shows the effect at two different physical locations of a recording disk of 2% aluminum addition into a CrMo20 alloy to form CrMo20Al2 alloy. It will be noted that the coercivity (Hr) is approximately 2.45–2.52 kOe for CrMo, and the coercivity increases to 2.80 and 2.62 with the addition of the aluminum.

Figure 3A:
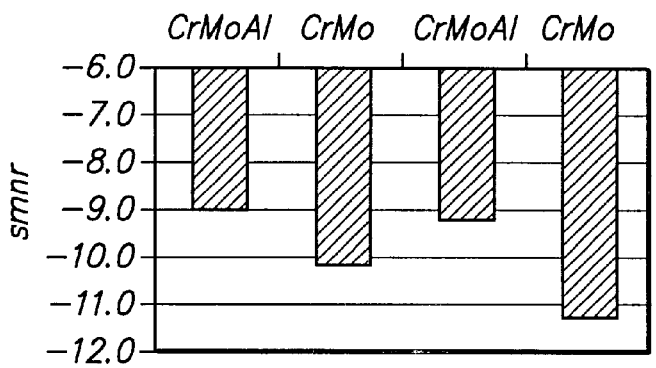
FIGS. 3a, 3b are graphs illustrating the effects on signal to noise ratio and pulse width, respectively, of the addition of aluminum in a CrMo underlayer placed on a Cr underlayer.
Figure 3B:
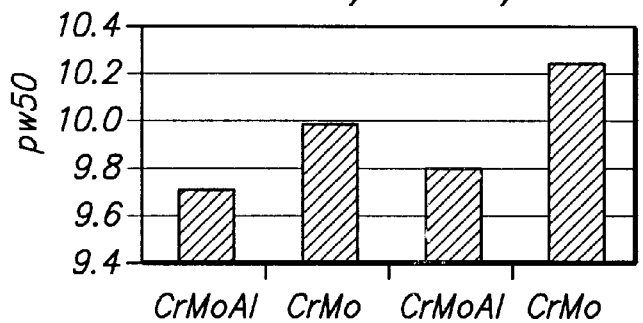

As illustrated in FIGS. 3a, 3b, in a Cr multi-underlayer construction, the CrMoAl layer helps improve the recording performance. In FIG. 3a, the signal to noise ratio (SMNR) is approximately −9.0 db for the underlayer for aluminum as opposed to from −10 to −11 db for the underlayer material without the addition of aluminum. As shown in FIG. 3b, the pulse width is between 9.7 and 9.8 for aluminum alloy and from approximately 10.0 to 10.2 for the CrMo underlayer without aluminum. Thus, the signal to noise ratio (SMNR) is increased with a narrower pulse width.

Figure 4:
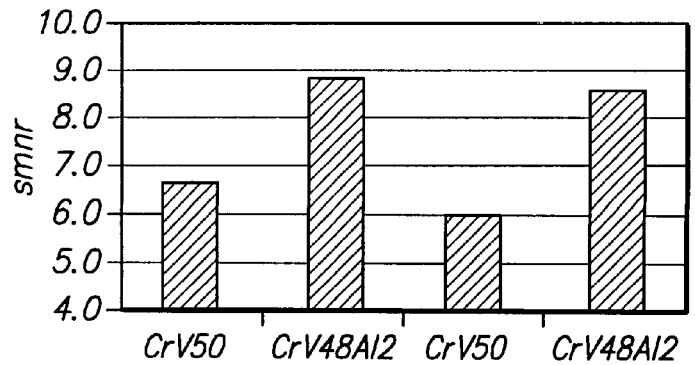
FIG. 4 is a graph illustrating the effect on a signal to noise ratio of the addition of aluminum to a CrV underlayer placed on a Cr underlayer.
Figure 5:
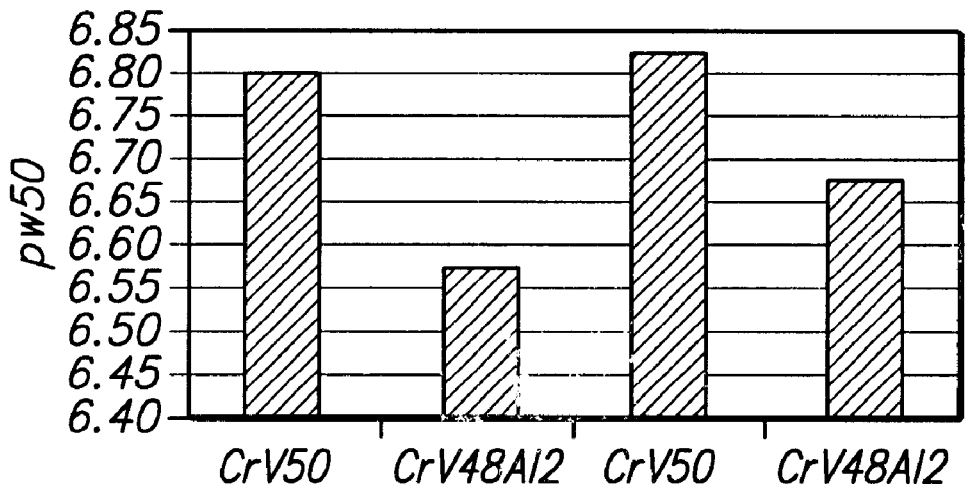
FIG. 5 is a graph illustrating the effect on pulse width of addition of aluminum in a CrV underlayer placed on a Cr underlayer.
Figure 6:
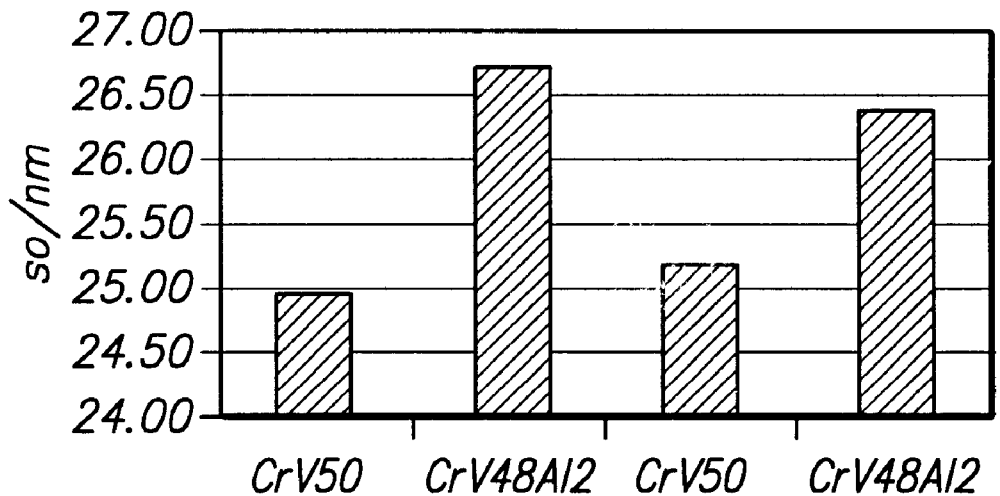
FIG. 6 is a graph illustrating the effect on intrinsic signal to noise ratio by the addition of aluminum in a CrV50 underlayer placed on a Cr underlayer.

Similarly, the addition of aluminum into CrV alloy also enhances the parametric and magnetic performance of a magnetic layer as illustrated at two physical locations on the recording medium for the underlayer with aluminum and for the underlayer without aluminum in FIGS. 4–6. In FIG. 4, the addition of aluminum into CrV50 enhances the SMNR by almost 33% (2 dB) and achieves a reduction in pulse width as illustrated in FIG. 5. The intrinsic signal to noise ratio is also increased by the use of a CrV48Al2 alloy in the underlayer structure as shown in FIG. 6.

There has been described an improved magnetic recording media in which a CrAlX underlayer is used in the structure. The CrAlX ternary alloy can be used as a single underlayer or can be used in a multilayer structure with a chromium or chrome alloy underlayer. While the invention has been described with reference to specific embodiments, the description is illustrative of the invention and is not to be construed as limiting the invention. Various modifications in the application may occur to those skilled in the art without departing from the true spirit and scope of the invention as defined by the appended claims.

What is claimed is:

1. A magnetic recording medium comprising;

a supporting substrate;

an underlayer supported by the substrate and comprising a chromium aluminum ternary alloy (CrAlX) wherein the aluminum in the underlayer is 0.5%–4.0% by atomic weight;

a second underlayer of chromium or chromium alloy disposed between the substrate and the underlayer; and a magnetic layer overlying the underlayer.

2. The magnetic recording medium as defined by claim 1 wherein the magnetic layer comprises a cobalt alloy.

3. The magnetic recording medium as defined by claim 2 wherein the supporting substrate comprises NiP.

4. The magnetic recording medium as defined by claim 2 wherein the supporting substrate comprises glass.

5. The magnetic recording medium as defined by claim 1 wherein the aluminum in the underlayer is 0.5%–4.0% by atomic weight.

6. The magnetic recording medium as defined by claim 1 wherein the underlayer includes an element selected from the group consisting of C, Mg, Si, Ti, V, Co, Ni, Cu, Zr, Mo, Nb, La, Ce, Nd, Gd, Tb, Dy, Er, Ta, W and Mn.

7. The magnetic recording medium as defined by claim 1 wherein the underlayer includes an element selected from the group consisting of Mo and V.

8. The magnetic recording medium as defined by claim 1 wherein the underlayer includes Mo.

9. The magnetic recording medium as defined by claim 1 wherein the underlayer includes V.

10. The magnetic recording medium as defined by claim 1 wherein the medium comprises a magnetic disk.

11. In a magnetic recording medium having a multilayer structure including a supporting substrate, an underlayer, a second underlayer and a magnetic layer, the second underlayer of chromium or chromium alloy between the substrate and the underlayer, and the underlayer between the substrate and the magnetic layer comprising;

a ternary alloy of chromium, aluminum, and a third element (CrAlX) wherein the aluminum in the underlayer is 0.5%–4.0% by atomic weight.

12. The structure as defined by claim 11 wherein the aluminum in the underlayer is about 2% by atomic weight.

13. The structure as defined by claim 11 wherein the underlayer includes an element selected from the group consisting of C, Mg, Si, Ti, V, Co, Ni, Cu, Zr, Mo, Nb, La, Ce, Nd, Gd, Tb, Dy, Er, Ta, W and Mn.

14. The structure as defined by claim 11 wherein the underlayer includes an element selected from the group consisting of Mo and V.

15. The structure as defined by claim 11 wherein the underlayer includes Mo.

16. The structure as defined by claim 11 wherein the underlayer includes V.

17. The magnetic recording medium as defined by claim 1 wherein the aluminum in the underlayer is 0.5%–2% by atomic weight.

18. The magnetic recording medium as defined by claim 1 wherein the aluminum in the underlayer is 0.5%–1% by atomic weight.

19. The structure as defined by claim 11 wherein the aluminum in the underlayer is 0.5%–2% by atomic weight.

20. The structure as defined by claim 11 wherein the aluminum in the underlayer is 0.5%–1% by atomic weight.

21. A magnetic recording medium comprising:

a supporting substrate;

a first underlayer supported by the substrate and comprising a chromium aluminum ternary alloy (CrAlX);

a second underlayer of chromium or chromium alloy disposed between the substrate and the first underlayer; and a magnetic layer overlaying the first underlayer.

22. In a magnetic recording medium having a multilayer structure including a supporting substrate and a magnetic layer, a multilayer underlayer between the substrate and the magnetic layer comprising:

a first underlayer comprising a ternary alloy of chromium, aluminum, and a third element (CrAlX); and a second underlayer of chromium or chromium alloy disposed between the substrate and the first underlayer.

23. The magnetic recording medium as defined by claim 21 wherein the first underlayer includes an element selected from the group consisting of C, Mg, Si, Ti, V, Co, Ni, Cu, Zr, Mo, Nb, La, Ce, Nd, Gd, Th, Dy, Er, Ta, W and Mn.

24. The magnetic recording medium as defined by claim 21 wherein the first underlayer includes Mo.

25. The magnetic recording medium as defined by claim 21 wherein the first underlayer includes V.

26. The magnetic recording medium as defined by claim 21 wherein the first underlayer is CrMo20Al2.

27. The magnetic recording medium as defined by claim 21 wherein the first underlayer is CrV48Al2.

28. The structure as defined by claim 22 wherein the first underlayer includes an element selected from the group consisting of C, Mg, Si, Ti, V, Co, Ni, Cu, Zr, Mo, Nb, La, Ce, Nd, Gd, Tb, Dy, Er, Ta, W and Mn.

29. The structure as defined by claim 22 wherein the first underlayer includes Mo.

30. The structure as defined by claim 22 wherein the first underlayer includes V.

31. The structure as defined by claim 22 wherein the first underlayer is CrMo20A12.

32. The structure as defined by claim 22 wherein the first underlayer is CrV48A12.

* * * * *